United States Patent Office 3,008,939
Patented Nov. 14, 1961

3,008,939
PHOSPHORYLATED OLEFIN POLYMERS
Juel P. Schroeder, Bernardsville, and Edward C. Leonard, Jr., Bloomfield, N.J., assignors to Union Carbide Corporation, a corporation of New York
No Drawing. Filed Dec. 27, 1957, Ser. No. 705,485
25 Claims. (Cl. 260—88.2)

This invention relates to high molecular weight phosphorus-substituted lower olefin polymers and to the process for producing such polymers. More particularly, this invention relates to ethylene and propylene homopolymers and copolymers containing phosphonyl dichloride or phosphonic acid groups and cross-linked derivatives thereof as novel compositions of matter. Still more particularly, this invention relates to a novel method for altering the properties of such polymers as polyethylene, polypropylene, polybutenes, ethylene-propylene copolymers, ethylene-butene copolymers, and the like, by introducing phosphorus-containing groups into the polymer, thereby modifying the stiffness, solvent resistance, and other properties in a controllable manner and introducing sites for cross-linking and vulcanizing such thermoplastic polymers.

According to the present invention, we have now discovered that phosphorus can be introduced into olefin polymers in the form of phosphonyl dichloride groups by the reaction of phosphorus trichloride and oxygen with lower olefin polymers and copolymers.

We have further found that functional derivatives of such phosphorylated polyolefins, for instance polyolefin phosphonic acids, phosphonic esters, and thermosetting and vulcanized phosphorus-containing polymers can be prepared from these phosphorylated polyolefins. Through the practice of our invention, it is possible to alter the properties of such polymers in a controlled manner to give tough, rubbery or leathery materials, increase the softening point and rigidity of low molecular weight greases, increase the dispersibility in water, improve the solvent resistance of the polymer, and create sites for vulcanization and cross-linking to render the polymer heat-convertible.

In the preferred manner of practicing this invention and as one embodiment thereof, the polyolefin is dissolved or dispersed in phosphorus trichloride and the mixture contacted with molecular oxygen. This is conveniently accomplished by slowly bubbling dry air or oxygen through the polyolefin-phosphorus trichloride mixture until the desired degree of phosphorylation is achieved. We have found that phosphorylation can be carried out in such a manner as to introduce as much as 16 percent by weight phophorus into the polymer. The most significant changes in the polyolefin properties appear to occur when the polymer contains about 5 percent by weight of phosphorus or more. However, for such operations as vulcanization and cross-linking, amounts of 0.2–2 percent are sufficient.

A convenient manner of following the reaction to determine the amount of phosphorus introduced into the polymer is the rate of HCl evolution. A reasonably good correlation between the rate of phosphorylation is achieved since one mole of HCl is liberated for each mole of phosphorus trichloride reacted with the polymer.

In this reaction, there is no concomitant chlorination of the hydrocarbon chain and the only chlorine appearing in the products is in the phosphonyl groups. Thus the problems of heat and light stability caused by chlorination of the hydrocarbon chain are avoided, and a more stable product secured.

The temperature of reaction is not narrowly critical in the practice of this invention, and may range anywhere from room temperatures and below to about the decomposition temperature of the polymer. From our experience in this reaction, temperature has little significant effect upon the rate of phosphorylation. Thus any convenient temperature below the temperature where the polymer begins to degrade or decompose can be employed.

Temperatures from about room temperature (about 20° C.) to about the refluxing temperature of the phosphorus trichloride (about 75° C.) are the most convenient, although higher or lower temperatures can be employed if operation under pressure is desired or if adequate temperature controlling means is provided. Particularly preferred are temperatures between about 20° C. and 65° C., since operation can then be conducted at atmospheric pressures without elaborate reaction equipment or temperature controlling mechanisms.

It is, of course, desirable to have the polymer dissolved or dispersed in the phosphorus trichloride when carrying out the reaction under liquid phase conditions. Under such conditions, the nature of the polyolefin may indicate that a more specific temperature may be even more preferred for best operation. For instance, highly crystalline polymers may not be completely soluble in phosphorus trichloride at the lower temperatures and therefore it is desirable with such materials to run the reaction at a temperature above the precipitation temperature of the polymer. As an example, a polyethylene having an average molecular weight of about 20,000 and a high crystallinity (about 60 percent) will begin precipitating in phosphorus trichloride at about 60° C. or lower. Thus a faster rate of phosphorylation will occur at or above 60° C. since at lower temperatures a more limited surface area of the polymer is exposed to the reaction mixture and phosphorylation presumably occurs only on the surface of the precipitated particles.

Highly amorphous polymers, particularly polypropylene and the olefin copolymers, are soluble in phosphorus trichloride at pratcically all temperatures and precipitation problems seldom occur to affect the desirable operating temperatures of such highly soluble polymers.

The rate of phosphorylation of the polyolefin by the phosphorus trichloride and oxygen reaction has been found to increase with increasing rate of oxygen introduction up to a limiting value at which point a faster flow rate of oxygen has little more effect on the reaction. This is demonstrated in the following graph prepared from results of phosphorylation rate (as determined by HCl evolution) vs. oxygen flow rates employing 10 grams of a polyethylene having an average molecular weight of 20,000 dissolved in 200 grams of phosphorus trichloride and the reaction run at 70° C.

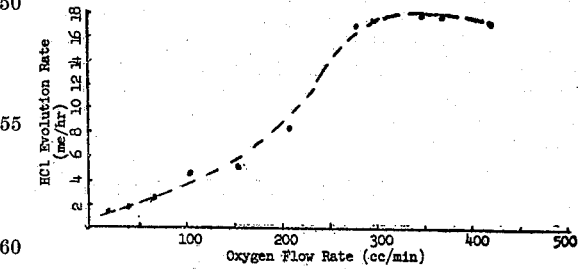

It is apparent from this graph that there is a limiting value of oxygen flow rate, and above this, little or no significant effect on rate of phosphorylation is secured. For obvious reasons, it is desired to run the reaction at the maximum effective addition rate, with the cooling capacity of the system arranged to remove the exothermic heat of reaction.

Coupled with the oxygen flow rate to achieve the most effective addition rate is the degree of contact of the oxygen-containing gas with the reaction mixture. The most intimate dispersion of the oxygen containing gas possible is desired in this reaction. Such means of obtaining this dispersion as fritted glass gas dispersers and the like are particularly desired although bubbling the oxygen containing gas through the mixtures by pipes or capillary tubes below the surface of the liquid can be employed.

The phosphorylation reaction proceeds freely without benefit of an added catalyst. However, the use of certain catalysts, particularly with the polyethylene polymers, can produce superior results when present in amounts of 1 to 10 parts by weight per 100 parts of polymer being phosphorylated.

Such catalysts as free-radical initiating catalysts e.g. azo compounds like bisazodiisobutyronitrile, peroxide catalysts for instance benzoyl peroxide, and certain metals particularly nickel, vanadium, silver, and manganese are effective. Also, particularly effective catalysts for this reaction are the monomeric olefins such as ethylene, propylene, butene-1, heptene-1, octene-1, and even polyethylene and polypropylene greases of low molecular weight. Actinic light has also been found to be an effective catalyst.

The following table illustrates the effect of various catalytic substances on the rate of phosphorylation. For this illustration, 10 grams of a polyethylene having an average molecular weight of about 20,000 in 200 grams of phosphorus trichloride was treated with oxygen at a rate of 270 cc. per minute. The reaction temperature was maintained at 70° C. for 4 to 5 hours. In each case about 0.5 to 1.0 gram of the catalytic material was present.

| Catalyst Used | Hydrogen Chloride Evolution (Milli-equivs./hr.) | Hydrolyzed Product | |
|---|---|---|---|
| | | Yield (g.) | Percent P |
| Octene-1 | 33 | 18.2 | 16.4 |
| Polyethylene grease | 33 | 19.9 | 15.6 |
| Actinic light | 42 | 20.0 | 15.5 |
| Nickel | 31 | 21.3 | 14.5 |
| Vanadium | 30 | 20.2 | 15.8 |
| Silver | 27 | 21.6 | 14.5 |
| Manganese | 21 | 16.0 | 13.5 |
| No catalyst | 17 | 15.3 | 12.4 |

The use of a catalyst in the reaction also facilitates the introduction of a greater amount of phosphorus into the polyethylene in shorter periods of time than is possible without a catalyst.

It is expedient in this process that the phosphorus trichloride be employed in amounts considerably in excess of the calculated amount needed to effect the desired degree of phosphorylation, in order to provide a very fluid medium for better agitation and contact with the oxygen. For such liquid phase reactions, it is preferred that the phosphorus trichloride be present in amounts of from about ten to thirty times the calculated amount to effect the desired amount of phosphorus content. However, it is possible and as another embodiment of this invention, to use lesser amounts of the phosphorus trichloride, i.e. two to five times the calculated and conduct the reaction in a semisolid phase in a kneader or mixer, or if desired, to use inert diluent free of reactive aliphatic groups, such as benzene, carbon tetrachloride, tetrachloroethylene, chloronaphthalene, and the like.

When diluents are employed, they can constitute up to about 90 percent by weight of the reaction mixture and a respectable rate of phosphorylation of the polymer still be secured. However, since their use is to make the reaction mixture more fluid for better oxygen contact, large excesses of diluents seem to serve no effective purpose. Therefore, it is preferred to use them only in amounts necessary to secure a fluid reaction medium.

The diluent, if employed, and any unreacted phosphorus trichloride can be removed by evaporation or distillation or the polymer recovered by precipitation by the addition of inert liquids in which the phosphorylated polymers are insoluble. However, if desired, the polymer can be recovered in the dissolved state in an inert solvent, for instance hydrocarbons and chlorinated hydrocarbons, by the addition of the solvent at the same time that the phosphorus trichloride is being distilled from the mixture. Such solvents as those employed as the inert reaction diluents can be used to displace the phosphorus trichloride in the solution. If they are employed during the removal of the phosphorus trichloride and phosphorus oxychloride in the reaction mixture, they should have a boiling point somewhat in excess of that of the materials being removed.

As another embodiment of the practice of this invention, it is possible to phosphorylate the surface of a formed polyolefin article, such as a cast or molded article, a sheet or plaque, or a fiber or filament. This is accomplished by passing the formed article into a bath of phosphorus trichloride in contact with molecular oxygen, for instance by bubbling oxygen through the PCl$_3$ treating bath or by wetting the surface with the phosphorus trichloride and drying in air or an oxygen atmosphere. With the highly soluble amorphous polymers, particularly the copolymers and low crystallinity polypropylene, the amount of phosphorus trichloride, or the contact time thereof should be such that the polymer does not substantially dissolve therein.

Surface phosphorylation of polyethylene and hydrolysis to the phosphonic acid derivative, we have found, improve solvent resistance of the polymer to hydrocarbon type solvents, such as benzene, toluene, and xylene, which are solvents for the starting polyethylene but in which the phosphorylated polyethylenes are either not soluble or are only slightly swelled. Such surface treatment is particularly effective on polyethylene, in sheets, filaments, and fibers. It is likewise possible after the phosphorylation to harden the surface of the formed article by cross-linking agents which react with the phosphonyl dichloride groups or derivative groups thereof.

The polyolefins containing these phosphonyl dichloride groups have been found to be highly reactive toward hydrolysis, esterification, and condensation reactions, which characteristics aid in producing functional derivatives of the phosphorylated polyolefin. They can also be vulcanized to rubbery elastic materials with metal oxides. Thus the physical properties of the polyolefin can be altered in many different ways, primarily depending on the amount of phosphorus introduced. These derivatives of the polyolefin phosphonyl dichloride can be so controlled as to impart many physical features not possessed by the polyolefin starting material.

For instance, by phosphorylating a polyethylene having an average molecular weight of about 2000 to contain about 5 percent by weight of phosphorus (as phosphonyl dichloride groups) and hydrolyzing the product with water, a rubbery, non-tacky resin having a softening temperature above about 60° C. is obtained, whereas the original polyethylene is a gummy, sticky grease having a softening temperature below normal room temperature. In addition, the hydrolyzed phosphorylated polymer will be more resistant to the action of solvents, being insoluble in carbon tetrachloride, chloroform, benzene, and ethylene dichloride, whereas the original starting polyethylene is completely soluble in all four solvents.

A similar change as regards solubility in non-polar solvents is also demonstrated with high mol. wt. polyethylene. For instance, a phosphorylated polymer having an average molecular weight of about 20,000 and containing over 5 percent by weight phosphorus, after hydrolysis to the phosphonic acid derivative will be only swollen in boiling benzene, carbon tetrachloride, and kerosene whereas the starting polyethylene is completely soluble in all of these solvents at elevated temperatures.

Phosphorylated polyethylenes in which the phosphonyl dichloride groups have been hydrolyzed to phosphonic acid groups have shown good ion exchange properties, and can have cation exchange capacities as high as six milli-equivalents per gram. They exchange selectively with salts of weak acids such as acetic, propionic, benzoic, and like acids but react only slightly with salts of strong acids. This feature is believed to be attributable to the intermediate acid strength of the polyethylene phosphonic acids.

It has also been demonstrated that by phosphorylating the olefin polymer or copolymer to contain at least about 15–16 percent by weight phosphorus and hydrolyzing the polyolefin phosphonyl dichloride to the phosphonic acid derivative, the resulting polymer will be water-soluble and can be used as a surfactant. The polyolefin phosphonic acids can be dissolved or dispersed in aqueous solutions for use in waxes and polishes to secure a thin protecting film or as a paint if a heavier coating is desired. They can also serve effectively as thickeners, coagulants, and as detergents in aqueous compositions.

Phosphonic acid products containing about 10 to 15 percent phosphorus by weight, while not completely soluble, are readily dispersible in water, particularly in alkaline aqueous solutions. Generally, high molecular weight polymers containing less than about 10 percent of phosphorus demonstrate complete water insolubility even in aqueous sodium hydroxide solutions.

The acidity of the polyethylene phosphonic acid makes the polymer reactive to other reactive agents through the phosphonic acid groups. Thus other reagents such as polyepoxides, polyamines, polyhydric alcohols, and phenols, and oxides of polyvalent metals can be employed to cross-link such polymers and increase the molecular weight of the polymers. The method can also render the polymer heat-convertible and thermosetting in nature as opposed to the normally thermoplastic polyolefin starting materials and the phosphonic acid derivatives.

In addition to hydrolyzing the polyethylene phosphonyl dichloride, phosphonate esters of the polyethylene can be prepared by treating the polyethylene phosphonyl dichloride with an alcohol in an inert medium such as xylene, either under slight vacuum or in the presence of a tertiary amine such as pyridine to remove hydrogen chloride which is formed in the reaction. The polyethylene phosphonate ester is then recovered by precipitation in absolute alcohol. These esters are heat convertible and are rendered solvent insoluble by heating to 50–100° C. Aliphatic alcohols, alkoxyalcohols, and phenols can be employed in preparing these phosphonate esters. We prefer the lower aliphatic alcohols, such as ethanol through octanol for the esterification. These polyethylene phosphonate esters are nearly transparent, very flexible, but tough resins, particularly those prepared using as the starting polyethylene a polymer having an average molecular weight of about 20,000 and phosphorylating it to contain at least 5 percent by weight phosphorus. The properties of these polymers are considerably changed over those of the normally opaque semi-rigid polyolefin starting materials.

Surface phosphorylation of formed polyethylene articles such as sheets, films, fibers, and the like, followed by alcoholysis to the alkyl phosphonate ester has been found to reduce the slip and increase solvent resistance of the formed article, particularly to aromatic hydrocarbon solvents. This is particularly beneficial in the surface treatment of sheets and fibers where exposure to solvents or solvent vapors is encountered in the service life of the formed article.

Chloroethyl esters of the phosphorylated polyolefins can also be prepared by the addition of ethylene oxide to the polymer in an inert solvent medium such as the reaction diluents heretofore mentioned, by use of a $TiCl_4$ catalyst. The chloroethyl phosphonate ester of a polyethylene having an average molecular weight of about 20,000 is a flexible, fibrous polymer which can be milled to a rubbery sheet. However, heating at temperatures of 150° C. or more finally causes the polymer to cross-link into an infusible resin. The resin is self-extinguishing when ignited as compared to the fast burning polyethylene and the slow burning polyethylene phosphonic acids and alkyl phosphonate esters. Polypropylene and ethylene-propylene and ethylene-butene copolymers behave in the same manner.

Heat-convertible cross-linkable resins can also be prepared from the polyolefin phosphonyl dichloride by the reaction of the phosphorylated polymer with polyhydric alcohols or polyhydric phenols, such as ethylene glycol, diethylene glycol, triethylene glycol, dihydroxydiphenylmethane, dihydroxydiphenyl-dimethylmethane, trimethylolphenol, and the like in the same manner as the phosphonate alkyl esters are prepared. Cross-linking can also be accomplished with difunctional amines, such as ethylene diamine, hexamethylene diamine, diethylene triamine, phenylene diamine, and the like. Polyfunctional epoxy compounds can be similarly employed.

Polyethylene phosphonamides can also be prepared from the polyolefin phosphonyl dichloride by reacting the polymer with an alkyl amine, for instance ethylamine, butylamine, dodecylamine, piperidine, N-ethyl aniline, and the like. The phosphonamides prepared from the polyolefin phosphonyl dichlorides made from low molecular weight polymers are stiff, rubbery products insoluble in hydrocarbon and chlorinated hydrocarbon solvents as compared to the highly soluble sticky, greasy polymer from which they are prepared.

The following examples are illustrative.

Example 1

A mixture of 50.0 parts of a polyethylene having an average molecular weight of about 2000 and 1000 parts of phosphorus trichloride were heated in a reactor equipped with a gas inlet tube, thermometer, reflux condenser, and mechanical stirrer. Dry oxygen was added through the gas inlet tube beneath the surface of the reaction mixture at a rate of about 0.15 part per minute. The temperature of the reaction mixture was maintained at 60° C. The exit gas was passed through a trap immersed in ice water to condense entrained volatilized phosphorus trichloride and oxychloride and passed then into water where the evolved hydrogen chloride was absorbed. The absorbed acid was titrated periodically with standard base for determination of rate of reaction. The rate of phosphorylation was approximately 0.6 milliequivalent of phosphorus introduced per hour per gram of polyethylene.

After 6½ hours of reaction under these conditions, the oxygen flow was stopped and $PCl_3$ and $POCl_3$ distilled from the reaction mixture at 40° C.–60° C. and 50 to 250 mm. Hg pressure while slowly adding anhydrous xylene at a rate to replace the phosphorus halides removed to give a solution, 100 parts of which contained about 17.7 parts of the original polyethylene as polyethylene phosphonyl dichloride. Twenty-five parts of this solution was poured into 285 parts of anhydrous nitromethane which caused the polyethylene phosphonyl dichloride to precipitate as a gum. After washing with additional anhydrous nitromethane, the product was dried in a vacuum oven at 40° C. at 5 mm. Hg pressure for two hours. The dried polyethylene phosphonyl dichloride was a non-tacky, elastic, brown rubbery resin containing 5.15 percent phosphorus by weight. It was insoluble in boiling xylene and burned very reluctantly in contrast to the starting polyethylene which was a tacky grease, soluble in xylene and burned readily.

Example 2

A mixture of 10.0 parts of a polyethylene having an average molecular weight of about 2000 and 200 parts of phosphorus trichloride was heated to 60° C. in equipment as described in Example 1. A second trap was installed in the exit gas line which was immersed in a Dry Ice-alcohol bath. Dry oxygen was bubbled through the reaction mixture at a rate of about 0.15 part per minute while keeping the reaction mixture at about 60° C. After about 5.5 hours of reaction, the oxygen flow was stopped. The rate of phosphorylation was 0.7 milliequivalent per hour per gram of polyethylene as determined by the rate of HCl evolution.

The polyethylene phosphonyl dichloride produced was hydrolyzed to the polyethylene phosphonic acid by pouring the reaction mixture into 2000 parts of ice water. The polyethylene phosphonic acid precipitated in the ice water mixture was filtered off and washed thoroughly with 4000 parts of water and then with 3000 parts of ethanol and dried in a vacuum oven at 50° C. and 5 mm. Hg pressure. The dried polyethylene phosphonic acid was a non-tacky, brown rubbery resin containing 7.6 percent phosphorus and was soluble in boiling pyridine but insoluble in water and common hydrocarbon solvents.

*Example 3*

A mixture of 10.0 parts of a polyethylene having an average molecular weight of about 2000, 200 parts of phosphorus trichloride, and 1.0 part of bisazodiisobutyronitrile as a catalyst was heated to 30° C. in equipment as described in Example 2. Dry oxygen was bubbled through the reaction mixture at 0.15 part/min. for 6.5 hours while maintaining the reaction mixture at 30° C. The rate of HCl evolution during the phosphorylation was 1.9 milliequivalents per hour per gram of polyethylene.

The polyethylene phosphonyl dichloride produced was hydrolyzed and recovered in the manner described in Example 2. The dried product was similar in appearance to that prepared in Example 2, was almost completely soluble in water, highly swollen in ethanol, and contained 15.5 percent by weight of phosphorus.

*Example 4*

In the same apparatus as described in Example 2, 10.0 parts of a polyethylene having an average molecular weight of about 20,000 and 200 parts of phosphorus trichloride were heated to 74° C. (refluxing) until solution of the polyethylene was complete. The temperature was dropped to 70° C. and maintained there while dry oxygen was bubbled through the solution at a rate of about 0.15 part per minute. The rate of phophorylation as determined by the rate of HCl evolution was 1.3 milliequivalents per hour per gram of polyethylene. After 4 hours of reaction, the addition of oxygen was stopped and the phosphorus halides were distilled from the reaction mixture at 21–48 mm. Hg pressure at 23° C.–52° C. During the distillation, anhydrous tetrachloroethane was slowly added to replace the phosphorus halides. The residue after removal of all phosphorus halides was a pale yellow solution of the polyethylene phosphonyl dichloride in tetrachloroethane.

The polyethylene phosphonyl dichloride was converted to the chloroethyl phosphonate ester by slowly adding to the solution of the polyethylene phosphonyl dichloride 16 parts of ethylene oxide in the presence of 0.4 part of $TiCl_4$ as a catalyst, with the temperature maintained at 55° C. The resulting 2-chloroethyl polyethylene phosphonate was precipitated from the viscous yellow mixture by the addition of 2000 parts of ethanol. The precipitated 2-chloroethyl polyethylene phosphonate was filtered, washed with ethanol, and dried in a vacuum oven at 50° C. and 5 mm. Hg pressure. The product was a white fibrous polymer weighing 13.7 parts. On milling at 150° C. for three minutes, it formed a smooth rubbery sheet. It was converted into a cross-linked infusible resin by further heating and milling.

*Example 5*

A solution of 20 grams of polypropylene (71 percent amorphous, reduced viscosity of amorphous portion 1.3 measured as a 0.2 gram sample in 100 ml. of p-xylene at 25° C.) dissolved in 200 grams of phosphorus trichloride was heated to 40° C. and oxygen at the rate of 200 cc. per minute was bubbled through the solution. Titration of the hydrochloric acid evolved with 0.5 N NaOH enabled the reaction to be followed. The oxygen addition was continued for 30 minutes, with the polymer then containing 1.5 percent phosphorus as phosphonyl dichloride groups.

The polymer was recovered by pouring the reaction mixture into an equal quantity of 95 percent alcohol to hydrolyze the phosphonyl dichloride groups to phosphonic acid groups and precipitate the polymer. The polymer was filtered off and washed with additional quantities of alcohol to remove any contaminants, and then dried in vacuo (29″ Hg) for about 12 hours at a temperature of 60° C.

The polymer was a white rubbery product. Vulcanization of 10 parts of this product with 4 parts of litharge at a temperature of about 165° C. for 30 minutes gave a highly elastic polymer with a tensile strength of about 1220 p.s.i. and an elongation at break of 300 percent.

*Example 6*

To a mixture of 20 parts of a polyethylene having an average molecular weight of about 2000 and 200 parts of phosphorus trichloride, dry oxygen was slowly added at a rate of 0.03 part per minute beneath the surface of the mixture for 143 minutes while maintaining the reaction temperature at 30° C.–50° C. After the oxygen flow was stopped, approximately two-thirds of the phosphorus halides were distilled off at 72° C.–85° C. at atmospheric pressure. To the residue, comprising the polyethylene phosphonyl dichloride and phosphorus halides, there was added cracked ice and water to hydrolyze the phosphonyl dichloride to the phosphonic acid derivative. The white waxy polymer was filtered from the mixture and washed with water and dried at 40° C. in a vacuum oven at 20 mm. Hg pressure. The polymer was reprecipitated twice from a boiling pyridine solution by addition to ethanol, washed with aqueous HCl and ethanol and redried, yielding 24.4 parts of a non-tacky fibrous rubber. The polyethylene phosphonic acid contained 4.0 percent of phosphorous by weight. The product was hot pressed at 155° C. and 500 p.s.i. into a tough flexible sheet. The polymer was soluble in pyridine and insoluble in chloroform, benzene, and ethylene dichloride even at their boiling points. By contrast, the original polyethylene was a soft, sticky grease, soluble in all these solvents.

*Example 7*

The procedure of Example 6 was repeated with a polyethylene having an average molecular weight of about 20,000 at a reaction temperature maintained between about 60° C. and 70° C. during the 102 minutes the oxygen was being added.

The dried polyethylene phosphonic acid (24.2 parts recovered) resembled the original polyethylene used, but was insoluble in hot benzene, carbon tetrachloride, and kerosene, whereas the original polyethylene was soluble in all these solvents. The product was soluble in boiling quinoline and boiling benzyl benzoate.

*Example 8*

The ion exchange properties of polyethylene phosphonic acids such as the products from Examples 2 and 6 are illustrated by this example.

Approximately two gram samples of the granular polyethylene phosphonic acid resin were placed in 100 ml. of 0.5 N aqueous solutions of the following: sodium chloride, sodium acetate, and sodium hydroxide. The mixtures were allowed to stand overnight and where then shaken for an hour to complete equilibration. Aliquots of the clear supernatant liquids were withdrawn and titrated to the phenol-phthalein endpoint with standard base or acid. The difference between this titre and a blank titration of an aliquot of the particular reagent gave a measure of the exchange capacity of the resin toward sodium ions. The results for four different resins are presented in the table below.

| Polyethylene Phosphonic Acid | | Exchange Capacity (milliequivs. per gram of resin) | | |
|---|---|---|---|---|
| Molecular Weight | Phosphorus Content (percent) | Sodium Chloride | Sodium Acetate | Sodium Hydroxide |
| 20,000 | 8.1 | 0.37 | 1.5 | 4.1 |
| 20,000 | 8.4 | 0.54 | 2.2 | 4.7 |
| 2,000 | 10.0 | 0.76 | 4.2 | 4.1 |
| 2,000 | 12.1 | 0.86 | 4.0 | 5.9 |

It will be seen that the resins exchanged only slightly with the salt of a strong acid (sodium chloride), more extensively with the salt of a weak acid (sodium acetate) and still more completely with a strong base (sodium hydroxide).

Example 9

Approximately 0.002 inch thick films of polyethylene (mol. wt. 20,000) were immersed in phosphorus trichloride for 30–60 seconds, tranferred to a vessel filled with oxygen for 30–60 seconds and finally immersed in water. The films, after washing with water and drying, were less slippery and much more resistant to attack by aromatic solvents such as xylene than the original, untreated film. Quenching the phosphorylated film in 95 percent ethanol rather than in water gave similar results, the 5 percent water in the ethanol being sufficient to hydrolyze the phosphonyl dichloride groups to phosphonic acid groups.

Example 10

A solution containing 200 grams of phosphorus trichloride and 20 grams of an ethylene-propylene copolymer containing propylene in an amount of 65 percent by weight by infra-red analysis (copolymer melt index of 0.48 as determined at 190° C. at 44 p.s.i. on an ICI grader) was heated to 40° C. and oxygen was bubbled through the solution at a point below the liquid level at a rate of 200 cc. per minute. When the phosphorous content of the polymer was determined to be 2.2 percent as determined by the hydrogen chloride evolved, the reaction was terminated by stopping the flow of oxygen and adding 200 ml. of 95 percent ethanol. The 5 percent water in the ethanol was sufficient to cause hydrolysis of the phosphonyl dichloride groups in the polymer and the ethanol caused the polymer to precipitate. The polymer was filtered off and washed with additional quantities of ethanol to remove contaminants, and was then dried in vacuo at 50° C. for about 12 hours.

The resulting product was only partially soluble in benzene, whereas the original copolymer was highly soluble in benzene. Vulcanization of the recovered polymer yielded a highly elastic polymer having good tensile strength.

Example 11

Oxygen was passed at a rate of 0.39 part per minute into a solution of 10.0 parts of polyethylene (mol. wt. 20,000) in 200 parts of phosphorus trichloride at 70° C. in an apparatus essentially as described in Example 2. A total of 2.45 parts of hydrogen chloride was evolved over a period of five hours (average rate of evolution 0.49 part per hour). After cooling to room temperature, the clear yellow solution was hydrolyzed by pouring slowly with stirring into cold water. The precipitate was washed with water and dried at 50° C. in a vacuum oven to give 15.3 parts of light brown semi-rigid polymer containing 12.4 percent phosphorus by weight.

This procedure was repeated with inclusion in the reaction mixture of 0.5–1.0 part of various catalysts. The results are presented in the table below.

| Catalyst | Rate of Hydrogen Chloride Evolution (parts/hour) | Hydrolyzed Product | |
|---|---|---|---|
| | | Yield (parts) | Percent P |
| Actinic light | 1.54 | | |
| Octene-1 [a] | 1.20 | 18.2 | 16.4 |
| Polyethylene grease [a] | 1.20 | 19.9 | 15.6 |
| Nickel | 1.13 | 21.3 | 14.5 |
| Vanadium | 1.10 | 20.2 | 15.8 |
| Silver | 0.99 | 21.6 | 14.5 |
| Manganese | 0.77 | | |
| No catalyst | 0.49 | 15.3 | 12.4 |

[a] These reactions were run at 55° C. instead of 70° C. because olefinic catalysts operate more effectively at the lower temperature. In the absence of catalysts, the phosphorylation rate is essentially the same at 55° C. and 70° C.

Example 12

To a 500 cc. flask equipped with a stirrer, condenser, and thermometer there was charged 300 cc. of phosphorus trichloride and 15 grams of an ethylene-propylene copolymer. The copolymer had a propylene content of 60 percent by weight as determined by infra-red analysis with a spectrum showing little or no crystallinity. Oxygen was added to the solution at a point below the surface at a rate of 200 cc. per minute. The phosphorylation was continued under these conditions for 25 minutes and the reaction rate followed by titrating the evolved hydrogen chloride with 0.5 N NaOH. The polymer was hydrolyzed and precipitated by the addition of 95 percent ethanol and dried in vacuo. The phosphorus content was 1.7 percent. The phosphorylated copolymer in the dried form was a white, rubbery solid.

Example 13

To 750 grams of the copolymer as described in Example 12 there was added 550 grams of phosphorus trichloride. The mixture was added to an enclosed mechanical kneader maintained at 100° C. Oxygen was passed into the kneader at the rate of 200 cc. per minute. At the end of 4¾ hours, the reaction was terminated and 1 liter of 95 percent ethanol was added to the reaction mixture to hydrolyze the phosphorylated polymer and precipitate dissolved polymer from the excess phosphorus trichloride. The phosphorylated polymer was filtered off from the resultant mixture and washed with additional quantities of ethanol and dried in vacuo at 60° C. for 12 hours. The resulting product had a phosphorus content of 0.77 percent and solubility of 45 percent by weight in benzene. This is contrasted to the initial copolymer which was 86.8 percent soluble in benzene. In all of the foregoing examples parts are parts by weight unless otherwise indicated.

We claim:

1. A process for the introduction of phosphorus containing groups into lower hydrocarbon monoolefin polymers which comprises reacting said olefin polymers with phosphorus trichloride and oxygen.

2. A process for the production of phosphorylated olefin polymers which includes the steps of contacting a mixture of a lower hydrocarbon mono-olefin polymer and phosphorus trichloride with molecular oxygen at a temperature within the range of about 20° C. to about 75° C.

3. A process for the production of phosphorylated olefin polymers which includes the steps of dissolving a lower hydrocarbon mono-olefin polymer in phosphorus trichloride and contacting the resulting solution with an oxygen-containing gas in the presence of a catalyst, said solution being maintained at a temperature within the range of about 20° C. to about 75° C.

4. A process for introducing phosphorus containing groups onto the surface of a formed lower hydrocarbon mono-olefin polymer which includes the steps of wetting the surface of the formed polymer with phosphorus trichloride and thereafter contacting the said wetted surface with an oxygen-containing gas.

5. A process for introducing phosphonyl dichloride groups into a lower hydrocarbon mono-olefin polymer which includes the steps of dissolving said olefin polymer in phosphorus trichloride and contacting the resulting solution with oxygen.

6. A process according to claim 5 in which a catalyst is employed.

7. A process according to claim 5 in which the lower olefin polymer is polyethylene.

8. A process according to claim 5 in which the lower olefin polymer is polypropylene.

9. A process according to claim 5 in which the lower olefin polymer is a copolymer of ethylene and propylene.

10. A process for increasing the solvent resistance of normally solid polymeric lower hydrocarbon mono-olefins which includes the steps of contacting the said polymeric olefin with phosphorus trichloride and oxygen for a time sufficient to introduce at least 1 part by weight of phosphorus as phosphonyl dichloride groups per 100 parts of said olefin polymer and thereafter hydrolyzing the resultant polymer.

11. A process for preparing water-dispersible lower hydrocarbon mono-olefin polymers which includes the steps of contacting the said polymer with phosphorus trichloride and oxygen for a time sufficient to introduce at least 10 parts by weight of phosphorus present as phosphonyl dichloride groups per 100 parts of said olefin polymer and thereafter hydrolyzing the resultant polymer.

12. A phosphorylated lower hydrocarbon mono-olefin polymer having phosphorus-containing groups chemically bound thereto and having a phosphorus content of at least 0.2 part by weight per hundred parts of said olefin polymer said polymer being free of chlorine atoms attached to carbon atoms of the hydrocarbon chain.

13. A phosphorylated lower hydrocarbon mono-olefin polymer having at least 0.2 part by weight of phosphorus present as phosphonyl dichloride groups per hundred parts of the said olefin polymer said polymer being free of chlorine atoms attached to carbon atoms of the hydrocarbon chain.

14. A phosphorylated polyethylene free of chlorine atoms attached to carbon atoms of the hydrocarbon chain and having at least 0.2 part by weight of phosphorus present as phosphonyl dichloride groups per hundred parts of polyethylene.

15. Product according to claim 14 in which the phosphonyl dichloride groups have been hydrolyzed to phosphonic acid groups, said product being characterized by ion exchange properties.

16. A phosphorylated polypropylene free of chlorine atoms attached to carbon atoms of the hydrocarbon chain and having at least 0.2 part by weight of phosphorus present as phosponyl dichloride groups per hundred parts of polypropylene.

17. A phosphorylated copolymer of ethylene and propylene free of chlorine atoms attached to carbon atoms of the hydrocarbon chain and having at least 0.2 part by weight of phosphorus present as phosphonyl dichloride groups per hundred parts of said copolymer.

18. A water-soluble lower hydrocarbon mono-olefin polymer containing at least ten parts by weight of phosphorus present as phosphonic acid groups per hundred parts of said olefin polymer said polymer being free of chlorine atoms attached to carbon atoms of the hydrocarbon chain.

19. A water-soluble reaction product of polyethylene, oxygen and phosphorus trichloride.

20. A heat convertible polyethylene phosphonate ester.

21. A formed polymer of a lower hydrocarbon mono-olefin having at least one surface which contains phosphorus chemically bound to carbon atoms of the said olefin polymer as phosphonyl dichloride groups.

22. A formed polymer of ethylene having at least one surface which contains phosphorus atoms chemically bound to carbon atoms of the said polymer, said phosphorus atoms being contained in alkyl phosphonate ester groups.

23. Heat convertible cross-linkable resins of a polymer of a lower hydrocarbon mono-olefin containing phosphorus atoms chemically bound to carbon atoms of the said polymer, said phosphorus atoms being contained in phosphonate ester groups of polyhydric compounds selected from the class of polyhydric alcohols and polyhydric phenols.

24. Polyethylene alkyl-phosphonamides having the phosphorus atom of the alkylphosphonamide group chemically bound to carbon atoms of the polyethylene.

25. Polyethylene chloroethylphosphonate ester having the phosphorus atoms of the chloroethylphosphonate ester groups chemically bound to carbon atoms of the polyethylene.

References Cited in the file of this patent

UNITED STATES PATENTS

| | | |
|---|---|---|
| 2,494,592 | Smyers | Jan. 17, 1950 |
| 2,671,077 | McCormack | Mar. 2, 1954 |
| 2,671,078 | McCormack | Mar. 2, 1954 |
| 2,671,079 | McCormack | Mar. 2, 1954 |
| 2,671,080 | McCormack | Mar. 2, 1954 |
| 2,829,137 | Yolles | Apr. 1, 1958 |

FOREIGN PATENTS

| | | |
|---|---|---|
| 591,058 | Great Britain | Aug. 6, 1947 |

OTHER REFERENCES

Mellor: "A Comprehensive Treatise on Inorganic and Theoretical Chemistry," vol. VIII, p. 1019, Longmans & Co. (N.Y., 1928).

"Organo-Phosphorous Compounds," by Kosolapoff, 1950, pages 66, 67 and 356.